United States Patent [19]

Bligh et al.

[11] 4,239,509
[45] Dec. 16, 1980

[54] METHOD OF PURIFYING CRUDE ARGON

[75] Inventors: Bernard R. Bligh, Hampton Hill; Stephen J. Godber, Woking, both of England

[73] Assignee: Air Products and Chemicals, Inc., Allentown, Pa.

[21] Appl. No.: 43,946

[22] Filed: May 30, 1979

[30] Foreign Application Priority Data

May 31, 1978 [GB] United Kingdom ............... 25890/78

[51] Int. Cl.³ ............................................. B01D 53/04
[52] U.S. Cl. ......................................... 55/66; 55/75
[58] Field of Search ................... 55/25, 26, 58, 62, 66, 55/68, 75; 62/18

[56] References Cited

U.S. PATENT DOCUMENTS

| | | | |
|---|---|---|---|
| 2,810,454 | 10/1957 | Jones et al. | 55/66 |
| 2,893,512 | 7/1959 | Armond | 55/66 X |
| 3,023,841 | 3/1962 | Milton et al. | 55/66 X |
| 3,103,425 | 9/1963 | Meyer | 55/68 X |
| 3,923,477 | 12/1975 | Armond et al. | 55/68 X |
| 3,928,004 | 12/1975 | Bligh et al. | 55/66 |
| 3,996,028 | 12/1976 | Golovko et al. | 55/66 X |

FOREIGN PATENT DOCUMENTS

1446201 8/1976 United Kingdom ........................ 55/66

*Primary Examiner*—Robert H. Spitzer
*Attorney, Agent, or Firm*—James C. Simmons; E. Eugene Innis

[57] ABSTRACT

A method for purifying crude argon containing argon, oxygen and nitrogen comprises the steps of reducing the amount of nitrogen in the crude argon to between a trace and 0.15% (by volume) and passing the remaining oxygen and argon, together with residual nitrogen, through 4A molecular sieve to separate the oxygen and argon. The 4A molecular sieve is particularly effective if steps are taken to ensure that all the remaining oxygen and nitrogen has to pass through a volume of 4A molecular sieve which is wholly at or below −250° F.

6 Claims, 1 Drawing Figure

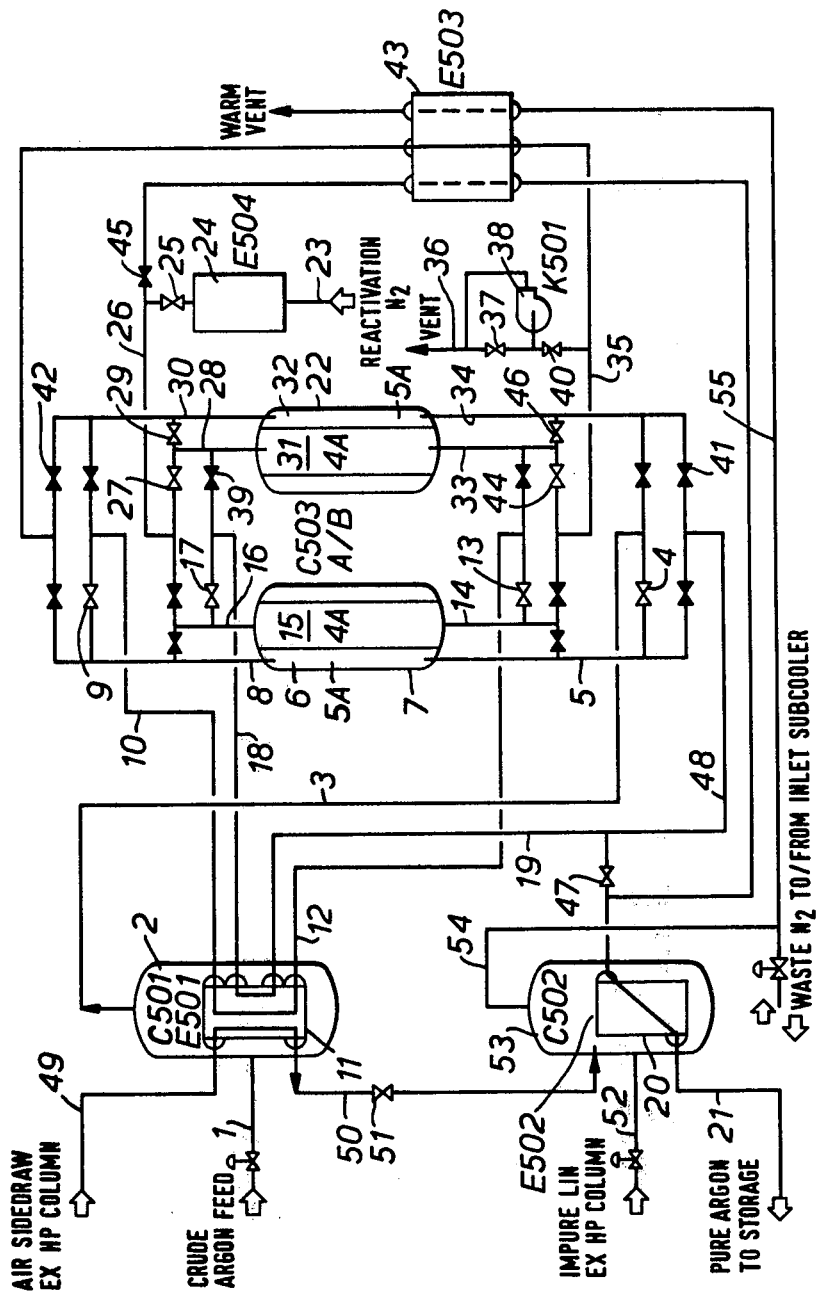

METHOD OF PURIFYING CRUDE ARGON

This invention relates to a method of purifying crude argon.

In our U.K. Pat. No. 1,446,201 there is described a method of purifying crude argon in which a stream of crude argon containing 3.5% oxygen and up to 1% (by volume) nitrogen is passed through a 4A (NaA) molecular sieve to absorb the oxygen. The argon is then separated from the remaining nitrogen by distillation. Although this method works quite well we found that oxygen broke through the 4A molecular sieve much earlier than anticipated.

On checking the 4A molecular sieve with crude argon from which all the nitrogen had been removed we found that the oxygen broke through the 4A molecular sieve approximately when anticipated.

Our first throughts were that as the nitrogen content of the crude argon increased the earlier the oxygen would break through the 4A molecular sieve.

Surprisingly, we have found that the crude argon can contain up to an estimated 0.15% (by volume) nitrogen and a confirmed 0.097% (by volume) without the oxygen breaking through the 4A molecular sieve earlier than anticipated. If, however, the crude argon contains in excess of 0.19% (by volume) nitrogen premature break through of oxygen occurs.

According to the present invention there is provided a method of purifying crude argon containing argon, oxygen and nitrogen, which method comprises the steps of reducing the amount of nitrogen in the crude argon to between a trace and 0.15% (by volume) by passing the crude argon through 5 A and/or 13X molecular sieve surrounding and in thermal contact, but separated from, a bed of 4A molecular sieve, and passing the remaining oxygen and argon, together with residual nitrogen, through 4A molecular sieve to separate the oxygen and argon the temperature of the 5A molecular sieve, crude argon and the remaining oxygen and argon being such that the remaining oxygen and argon passes through a volume of 4A molecular sieve which is wholly maintained at or colder than $-250°$ F. ($-157°$ C.).

Preferably the amount of nitrogen in the crude argon is reduced to between 0.0001% and 0.15% (by volume) and more preferably between 0.0001% and 0.1% (by volume).

Conveniently, the nitrogen may be removed from the crude argon by 5A (CaA) molecular sieve.

In addition to the above, we have also discovered that in order for the argon and oxygen to be separated effectively by the 4A molecular sieve (i.e. the product argon containing less than 5 ppm oxygen) the argon and oxygen must pass through a volume of the 4A molecular sieve which is wholly maintained at or colder than $-250°$ F. This should be contrasted against the prior art where even though the vessel containing 4A molecular sieve was nominally below $-250°$ F. the 4A molecular sieve in contact with the walls of the vessel containing the 4A molecular sieve was actually above $-250°$ F. despite being heavily insulated. We discovered that even if the amount of 4A molecular sieve above $-250°$ F. was tiny surprisingly high amounts of oxygen entered the product argon.

In order to maintain the entire volume of 4A molecular sieve below $-250°$ F. it would be possible to for example, keep the 4A molecular sieve in a vessel surrounded by liquid nitrogen. This would however be extremely expensive and we have found that satisfactory results can be achieved by keeping the 4A molecular sieve in a cylindrical vessel having its side(s) surrounded with 5A molecular sieve, and passing crude argon through the 5A molecular sieve at a temperature such that the temperature of the 5A molecular sieve in at least part of the length of the cylindrical vessel and across the entire cross-section of said part is at, or preferably below $-250°$ F.

For the avoidance of doubt the term cylinder used herein includes vessels of rectangular, square, elliptical and other cross-sections.

For commercial installations we would recommend that the crude argon in the 5A molecular sieve should be no warmer than $-270°$ F.

It is desirable to cool the argon and oxygen mixture leaving the 5A molecular sieve (together with the residual nitrogen) to below $-270°$ F. before being introduced into the 4 A molecular sieve.

If desired 13X (NaX) molecular sieve may be used in place of the 5A molecular sieve.

For a better understanding of the invention reference will now be made, by way of example, to the accompanying drawing which is a flowsheet of an apparatus in which the method of the present invention can be carried out.

Referring to the drawing a liquid crude argon feed containing 2% oxygen, 0.5% nitrogen and 97.5% argon is passed through conduit 1 into vessel 2 where it is vaporized. The vaporized feed passes through conduit 3, open valve 4 and conduit 5 to annular chamber 6 of a vessel 7. The vaporized feed enters the annular chamber 6 at 45 psia and $-280°$ F. The annular chamber 6 contains 5 A molecular sieve which adsorbs all but 5 ppm (0.0005% by volume) nitrogen from the feed but allows the remaining oxygen and argon to leave the vessel through conduit 8. The remaining oxygen and argon (containing 5 ppm nitrogen) leaves the annular chamber 6 at about $-250°$ F., the temperature rise being due to the heat of adsorption of the nitrogen on the 5 A molecular sieve and the ingress of heat from the surroundings.

The oxygen and argon passes through conduit 8, valve 9, conduit 10, and heat exchanger 11 in vessel 2 wherein it is cooled to $-275°$ F. The cooled oxygen and argon leaves the heat exchanger 11 through conduit 12 and, after passing through valve 13 and conduit 14 enters cylindrical chamber 15 of vessel 7. The cylindrical chamber 15 contains 4 A molecular sieve which adsorbs oxygen. Substantially pure argon, (i.e. argon containing less than 5 ppm each of oxygen and nitrogen) leaves the cylindrical chamber 15 though conduit 16 at approximately $-260°$ F. The substantially pure argon passes through valve 17 and conduit 18 to heat exchanger 11 wherein it is cooled to $-275°$ F. The cooled substantially pure argon leaves heat exchanger 11 through conduit 19 and is condensed in heat exchanger 20 before being passed through conduit 21 to storage.

Vessel 22 is similar in construction to vessel 7 and, in use, the molecular sieve in vessel 22 is regenerated whilst vessel 7 is on stream and vice versa. The molecular sieve in vessel 22 is regenerated by the following process:

First, nitrogen from conduit 23 is heated to 180° F. in heater 24 and after passing through valve 25, conduit 26 and valve 27 is divided into two streams. One stream passes through valve 29 and conduit 30 whilst the other stream passes through conduit 28. The nitrogen at 180°

F. passes in parallel through cylindrical chamber 31 containing 4 A molecular sieve and annular chamber 32 containing 5 A molecular sieve. The gas leaves chambers 31 and 32 through conduits 33 and 34 respectively and, after passing through valves 44 and 46 respectively is vented through conduits 35 and 36.

The hot nitrogen drives substantially all the oxygen from the 4A molecular sieve in cylindrical chamber 31 whilst a certain amount of nitrogen is desorbed from annular chamber 32 by the heat. After a period of time (typically 3 hours) heater 24 is switched off and nitrogen is passed through vessel 22 until the molecular sieve is cooled to about 80° F. At this stage valves 25 and 37 are closed and pump 38 is activated to evacuate vessel 22.

After a few minutes argon is allowed to enter vessel 22 by opening valve 39 and closing valve 40. Valve 39 is then closed, pump 38 activated and valve 40 opened to evacuate vessel 22. This procedure is repeated until the evacuated vessel 22 contains substantially no impurities.

The molecular sieves in annular chamber 32 and cylindrical chamber 31 are then cooled. In particular, valves 41, 42, 44 and 45 are opened and valves 46, 29, 39 and 47 are closed. This has the effect of diverting cold pure argon at −275° F. from conduit 19 through conduits 48 and 34 to annular chamber 22. The argon leaves annular chamber 32 through conduit 30 and after passing through valve 42 is cooled in heat exchanger 43 to −275° F. The argon then passes through conduit 35, and valve 44 to cylindrical chamber 31. The argon leaving the cylindrical chamber 31 passes through conduits 28 and 26 and is recooled in heat exchanger 43 before rejoining the conduit 19 downstream of valve 47. In order to vaporize the crude liquid argon feed dry, carbon dioxide free, high pressure air is introduced into heat exchanger 11 through conduit 49. The cold liquid air leaving heat exchanger 11 through conduit 50 is expanded across valve 51 and, together with liquid nitrogen from conduit 52, is introduced into vessel 53 where it is used to liquefy the pure argon product in heat exchanger 20. The vapour leaving the vessel 53 through conduit 54 is either vented or passed through heat exchanger 43 via conduit 55 when the regeneration cycle so requires.

It is important to ensure that all the molecular sieve in cylindrical chamber 31 is below −250° F. before the vessel 22 is returned on stream. Although we believe that a minimum temperature of −250° F. is essential we strongly recommend that vessel 22 should not be returned on stream until the temperature of the molecular sieve in cylindrical chamber 31 is cooled to below −274° F. and the temperature of the molecular sieve in annular chamber 32 is below −265° F.

What is claimed is:

1. A method for purifying crude argon containing argon, oxygen and nitrogen which method comprises the steps of reducing the amount of nitrogen in the crude argon to between a trace and 0.15% (by volume) by passing the crude argon through a first bed of 5 A and/or 13X molecular sieves surrounding and in thermal contact with a second bed of 4 A molecular sieve with a wall separating said 5 A and or 13 X molecular sieve from said 4 A molecular sieve and passing the remaining oxygen and argon, together with residual nitrogen, through said second bed to separate the oxygen and argon, the temperature of the 5 A and or 13 X molecular sieve, crude argon and the remaining oxygen and argon being such that the remaining oxygen and argon passes through a volume of 4A molecular sieve which is wholly maintained at or colder than −250° F.

2. A method according to claim 1, wherein the amount of nitrogen in the crude argon is reduced to between 0.0001% and 0.15% (by volume).

3. A method according to claim 1, wherein the amount of nitrogen in the crude argon is reduced to between 0.0001% and 0.1% (by volume).

4. A method according to claim 1, wherein the nitrogen is removed from the crude argon by 5 A molecular sieve.

5. A method according to claim 1, wherein the nitrogen is removed from the crude argon by 13 X molecular sieve.

6. A method according to claim 1, wherein said 4 A molecular sieve is contained in a cylinder the side(s) of which is surrounded by 13 X molecular sieve, and said crude argon passes through and leaves said 13 X molecular sieve at or below −250° F. and then passes through said 4 A molecular sieve.

* * * * *